United States Patent
Srinivasan et al.

(10) Patent No.: US 6,536,498 B1
(45) Date of Patent: *Mar. 25, 2003

(54) WELDING APPARATUS AND METHOD FOR JOINING ROOFING MATERIALS

(75) Inventors: Krishna Srinivasan, Mahwah, NJ (US); Brian E. Duffy, Wayne, NJ (US)

(73) Assignee: Building Materials Corporation of America, Wayne, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,373

(22) Filed: Nov. 12, 1998

(51) Int. Cl.$^7$ ............................................. E04D 15/04
(52) U.S. Cl. .................... 156/497; 156/499; 156/574
(58) Field of Search ............................ 156/71, 308.2, 156/308.4, 497, 499, 574

(56) References Cited

U.S. PATENT DOCUMENTS

| | | | |
|---|---|---|---|
| 4,204,904 A | 5/1980 | Tabor | 156/497 |
| 4,440,588 A * | 4/1984 | Stevenson et al. | 156/157 |
| 4,504,352 A | 3/1985 | Meyer | 156/499 |
| 4,834,828 A | 5/1989 | Murphy | 156/359 |
| 4,855,004 A | 8/1989 | Chitjian | 156/359 |
| 4,872,941 A | 10/1989 | Lippman et al. | 156/497 |
| 4,913,772 A | 4/1990 | Taylor et al. | 156/499 |
| 5,110,398 A * | 5/1992 | Murphy | 156/499 |
| 5,935,357 A * | 8/1999 | Hubbard et al. | 156/82 |

* cited by examiner

*Primary Examiner*—Michael W. Ball
*Assistant Examiner*—John T. Haran
(74) *Attorney, Agent, or Firm*—William J. Davis; Imre Balogh

(57) ABSTRACT

Pressure roller and heating element combination for a welding apparatus and a method designed to weld a first thermoplastic sheet laid on the deck of a roof structure and secured to the deck by a line of fastening means, and an overlapping second thermoplastic sheet disposed over the line of the fastening means. The pressure roller includes a distal end, a proximal end, and a center portion which defines a groove. The groove is provided with an elastomeric cushion to smoothly ride over the line of fastening means and expel air from between welds produced on both sides of the fastening means when the apparatus is advanced in tandem with a heating element longitudinally along the overlapping portions of the thermoplastic sheets.

7 Claims, 6 Drawing Sheets

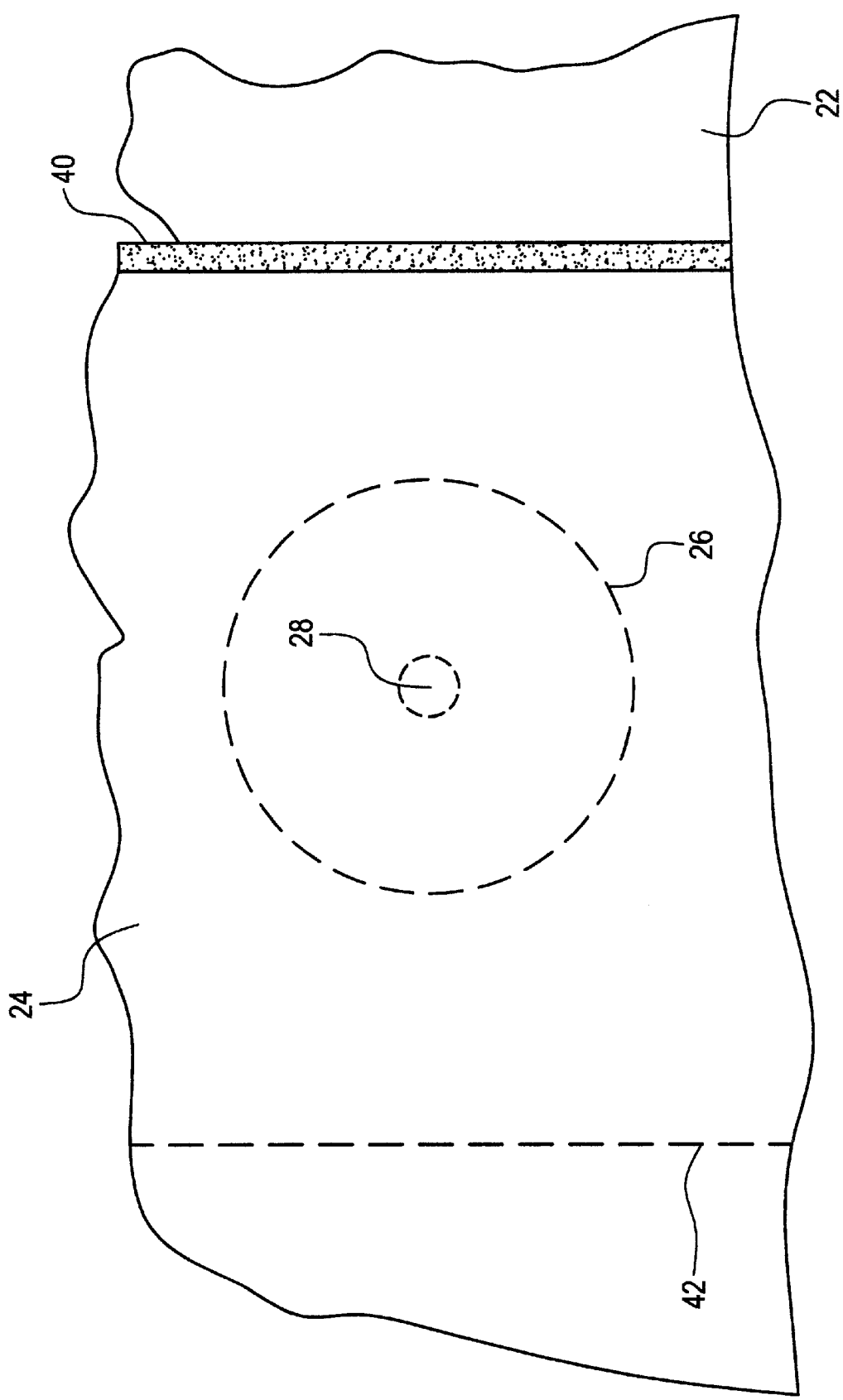

WELDING APPARATUS AND METHOD FOR JOINING ROOFING MATERIALS

BACKGROUND OF THE INVENTION

1. Field of the Invention

The present invention relates to an apparatus for use in welding seams of thermoplastic resin sheeting that is heat weldable, and more particularly, to an apparatus for applying welds to an overlapping portion of two roof membranes one of which is fastened close to its edge by fastening means to an underlying roof structure for securely holding the welded membranes in place.

2. Reported Developments

Thermoplastic roofing material manufactured in sheets are designed to be laid down on the roof in a slightly overlapping manner or in an abutting relationship and weld together to form a watertight seal. If the overlapping method is used, typically, one to three inches of the overlapped sheets are welded together. The welding is accomplished by subjecting the overlapped portions to heat, softening them to a weldable consistency and pressing them together manually or by pressure wheels of an apparatus. When the overlapped portions of the sheets cool, a solid, watertight seal is formed at the seam of the welding. When the sheets are laid down with their edges being in an abutting relationship, the sheets are welded together by the use of a strip or tape of thermoplastic material laid along the butt which tape fuses to both sheets, and when pressed manually, or by pressure wheels of an apparatus, forms a watertight seal upon cooling.

When an apparatus is used to accomplish the weld, it is generally motor driven, self-propelled and automatic in which a drive motor is connected through a drive train to one or more drive wheels. A heating means, such as a hot-air blower, and a sheet-handling means are provided on the apparatus for guiding at least one of the opposing sheets through the apparatus and past the heating means as the apparatus travels along the edge of one of the sheets. The edges of the opposing sheets are heated and laid or placed together while hot. The hot sheets are then subjected to compression rolls or wheels and are allowed to cool.

The prior art is replete with various apparatus and methods designed and constructed with specific objectives in mind. Illustrative examples of the prior art include the following references.

U.S. Pat. No. 4,204,904 is directed to a roofing material handling and sealing machine which comprises a lifting foot which lifts the upper overlapping edge portion of a thermoplastic sheet so that a heating element may heat both thermoplastic sheets to soften them, after which the thermoplastic sheets are sealingly joined by a tailing rear wheel which presses them together.

U.S. Pat. No. 4,504,352 discloses an apparatus for sealing lapped joints of thermoplastic sheets having an interchangeable drive for driving either or both of a pair of drive wheels which allow the apparatus to move forwardly for traverse of the lapped joint in either of the opposite directions of travel. The apparatus also includes a heating element, a leading pressure roll and a traction connection which are all independently interchangeable between the left and right sides of the apparatus to permit reversal of operating direction, i.e. to seal either left-facing or right-facing lapped joints.

U.S. Pat. No. 4,855,004 is directed to an automatic seam welding machine for thermoplastic materials. The machine includes a heat gun gimbal mounted on the frame of the machine and comprises a blower, a heating element and a shaped foot to direct hot air between overlapped thermoplastic sheets. A thermocouple in the foot senses air temperature and is adapted to control power to the heating element.

The frame is mounted on three wheels, two of which are driven by a DC motor. One of the driving wheels is a wide pressure roller which rides over the seam of the thermoplastic materials to be welded to ensure a complete seal.

U.S. Pat. No. 4,872,941 is directed to an automatic welding apparatus which includes an electrically heated prismatic membrane, and a first and a second means to produce fist and second streams of heated air to heat the thermoplastic sheets to be sealed together.

U.S. Pat. No. 4,913,772 is directed to a portable thermoplastic welding machine that includes the improvement of being able to heat different and opposing thermoplastic sheets to different temperatures using independently controlled electric, radiant heat sources and then compressing the sheets with a compression belt.

The general state of the prior art may further be gleaned from the following U.S. Pat. Nos. 4,087,309, 4,146,419, 4,239,581, 4,289,552, 4,354,893, 4,259,142, 4,447,288, 4,533,423, 4,725,328, 4,737,213, 4,744,855, 4,861,412, 4,894,112, 5,234,533, 5,250,143, 5,378,302, 5,569,352, 5,624,511, 5,776,299.

In laying thermoplastic sheets in overlapping relationship each other, it is not sufficient to fuse the overlapping portions of the sheets to each other. The sheets must also be secured to the underlying roof deck which holds the fused sheets so that environmental conditions, such as high wind, do not separate the fused sheets from the roof structure. For this reason a fastening mean is used to firmly hold the sheets on top of the roof deck. In a typical process, which takes place at the job site, a first thermoplastic sheet, obtained in a roll form from a supplier, is laid on a portion of the deck starting from one side of the roof. Then a fastening means, such as a batten bar or a line of stress plates is placed close and parallel to the edge of the sheet. The batten bar or line of stress plates on top of the sheet is secured to the underlying deck by securing means, such as screws or nails. Typically, the batten bar or stress plates are provided with holes through which the nails and screws can be driven into the deck. After this step in the process a second thermoplastic sheet is laid on the roof deck parallel to the first thermoplastic sheet and in an overhanging relationship therewith wherein the overlapping portion covers the fastening means on both sides thereof. A weld is then applied between the overlapped portion of the first sheet and the overlapping portion of the second sheet on one side of the fastening means and then another weld is applied between the overlapping portions of the sheets on the other side of the fastening means. As stated in U.S. Pat. No. 4,834,828, one of the disadvantages of this process is the necessity of having to apply a weld on one side of the fastening means and then apply a second weld on the other side of the fastening means. Said patent provides an improvement over the prior art by providing welding means that is capable of applying welds to thermoplastic sheets simultaneously on both sides of the fastening means. The apparatus to accomplish this objective includes a weld wheel comprising three portions: a first portion capable of being positioned on one side of the fastening means; a second portion capable of being positioned on the other side of the fastening means; and a third portion being a groove between the first and second portions designed to be positioned over the fastening means. First and second portions of the weld wheel apply pressure on the sheets on opposite sides of the fastening means, while the groove rides over on top of the fastening means.

As well known in the prior art, fastening means rise above the horizontal level of the first thermoplastic sheet laid down on the roof deck and, consequently, hold the second overlapping portion of the second sheet above the horizontal. If the fastening means are bulky, the rise above the horizontal level is accentuated. In addition stress plates, positioned spaced from each other in a line parallel to the edge of the sheet, form hills and valleys resembling a sinusoid or side curve which does not provide a smooth ride for the groove between the first and second portions of the weld wheel. The uneven ride of the groove results in uneven pressure exerted on the underlying thermoplastic sheets: when the groove rides over a stress plate, the pressure is greater, while the pressure in the space between the plates is less. The uneven pressure results in air pockets or bubbles as a result of hot air being entrapped between the sheets. Varying the dimensions of the groove does not eliminate the problem: if the depth of the groove is such that its bottom surface barely touches the fastening means, larger air pockets or bubbles are formed. On the other hand, if the depth of the groove is shallow, the first and second portions of the weld wheel tend to be lifted upward when the groove passes over the stress plates thereby reducing the required pressure of the weld wheel to press the overlapping layers together.

A main object of the present invention is to provide a weld wheel the use of which prevents the formation of air pockets or bubbles over the fastening means.

SUMMARY OF THE INVENTION

In accordance with the present invention there is provided a pressure roller and a heating element for a welding apparatus for producing a weld simultaneously on each side of a line of fasteners and over the fasteners. The pressure roller is integral with an axle designed to be connected to a driving means at one end thereof; at the other end of the axle the pressure roller comprises a distal end, a proximal end and a center portion which defines a groove between the proximal and distal ends. The groove of the pressure roller carries an elastomeric cushion designed to smoothly ride over a line of fastening means.

The pressure roller is used in combination with a heating element containing a blower which forces heated air through a nozzle. The nozzle having an outlet therein comprises three portions: two large opening portions and a restricted opening portion therebetween. In use, the large opening portions allow delivery of the major portion of the hot air produced by the heating element while the restricted opening still allows delivery of sufficient amounts of the heated air to soften the overlapping portions of the thermoplastic sheet over and under the fastening means.

BRIEF DESCRIPTION OF THE DRAWINGS

The invention will now be further described with reference to the drawings, in which:

FIG. 8 shows the two thermoplastic sheets welded together by the welding apparatus.

DETAILED DESCRIPTION OF THE INVENTION

Figure 1:
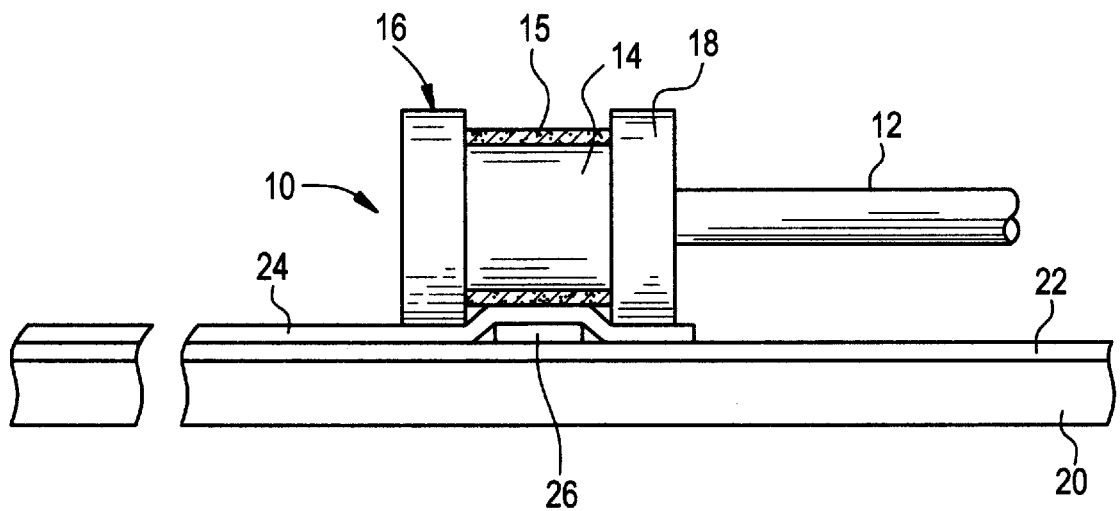
FIG. 1 is a front view of the pressure roller of the present invention as it rolls over overlapping joints of two thermoplastic sheets on both sides of a fastening means.

Referring to the drawings, FIG. 1 shows the front view of the pressure roller 10 of the present invention integral with an axle 12 designed to be connected to a driving means (not shown) at one end thereof. At the other end of the axle there is positioned pressure roller 10 having a distal end 16, proximal end 18, and center portion 14 which defines a groove between the proximal and the distal ends of the pressure roller. The groove 14 of the pressure roller 10 carries an elastomeric cushion, such as a rubber cushion 15 designed to ride over a line of fastening means 26, such as stress plates. FIG. 1 also shows deck 20 covering a roof structure which is to be covered by thermoplastic sheets 22 and 24. First thermoplastic sheet 22 is the bottom sheet fastened to deck 20 by fastening means 26 close to and parallel with the edge of thermoplastic sheet 22. Second, or overlapping thermoplastic sheet 24 is laid over first thermoplastic sheet on both sides of the fastening means.

Figure 2:
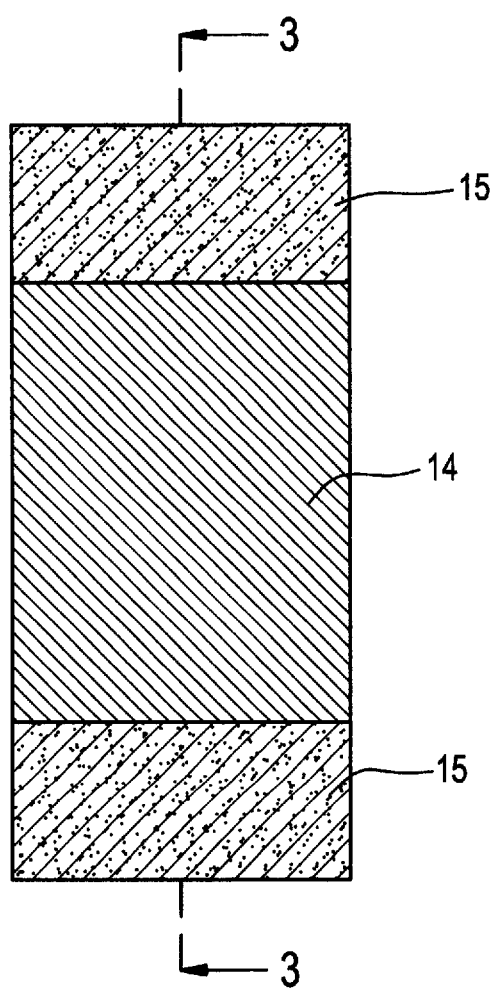
FIG. 2 is an enlarged side plan view of the center portion or groove of the pressure roller showing an elastomeric cushion thereon.

FIG. 2 is an enlarged side plan view of the center or groove 14 of pressure roller 10 showing approximate proportions of center or groove 14 and rubber cushion 15. The thickness of the rubber cushion is determined by the elasticity/compressibility of the rubber material used. Suitable elastomeric materials include, but are not limited to:

natural rubber;
acrylate-butadiene rubber;
cis-polybutadiene;
chlorobutyl rubber;
chlorinated polyethylene elastomers;
polyalkylene oxide polymers;
ethylene vinyl acetate;
fluorosilicone rubbers;
hexafluoropropylene-vinylidene fluoride-tetrafluoroethylene terpolymers;
butyl rubbers;
polyisobutene;
synthetic polyisoprene rubber;
silicone rubbers;
styrene-butadiene rubbers;
tetrafluoroethylene propylene copolymers; and
thermoplastic-copolyesters.

The durometer of the various elastomeric materials should preferably be in the range of from about 25 to 80 Shore A.

Figure 3:
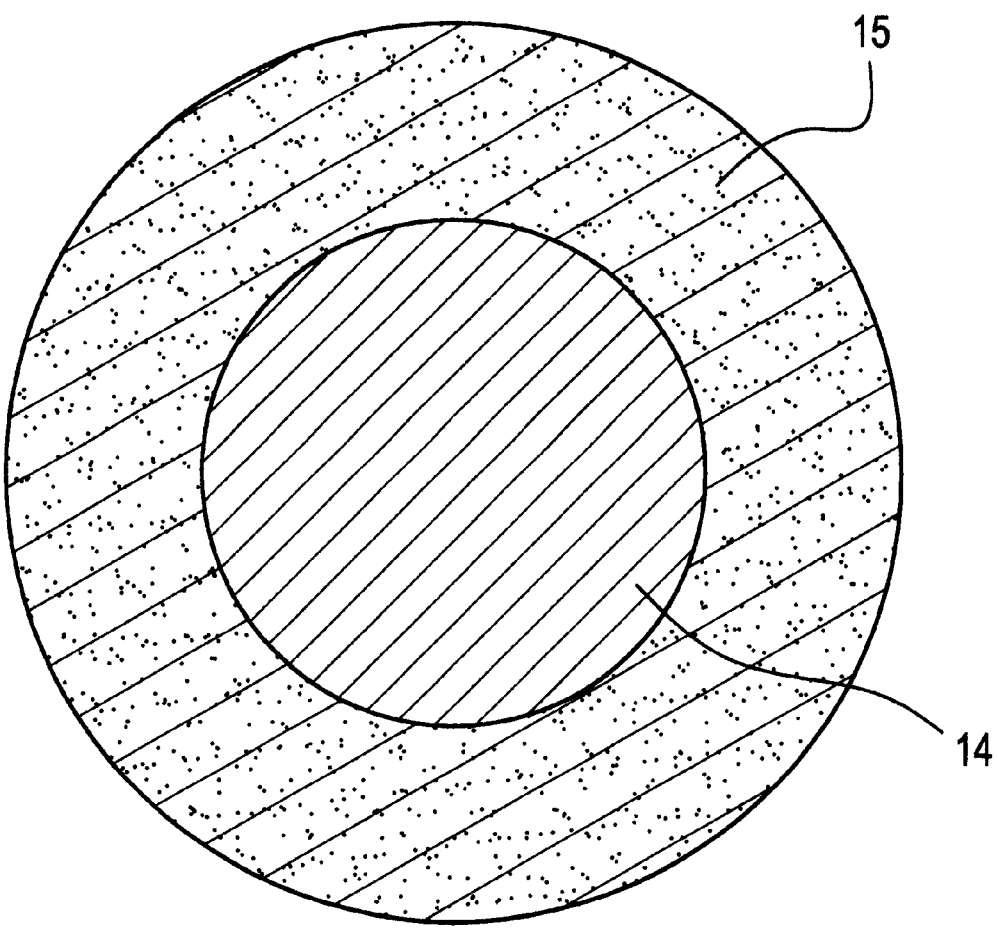
FIG. 3 is a cross-sectional view of the center portion or groove of the pressure roller taken along the line 3—3 of FIG. 2.

FIG. 3 is a cross-section of the center or groove of the pressure roller illustrating approximate proportions of center 14 and rubber cushion 15 in which center 14 is integral with axle 12 (as shown in FIG. 1) and is made of metal, such as stainless steel. The thickness of rubber cushion used is also influenced by the dimensions of the fastening means used, especially its height rising above the horizontal plane of the first thermoplastic sheet 22: the larger the height of the fastener the more thickness and resiliency is required in the cushioning material so that the riding over is smooth, and at the same time, the formation of air pockets or bubbles are prevented by the force exerted on the overlapping second thermoplastic sheet by the rubber cushion.

Figure 4:
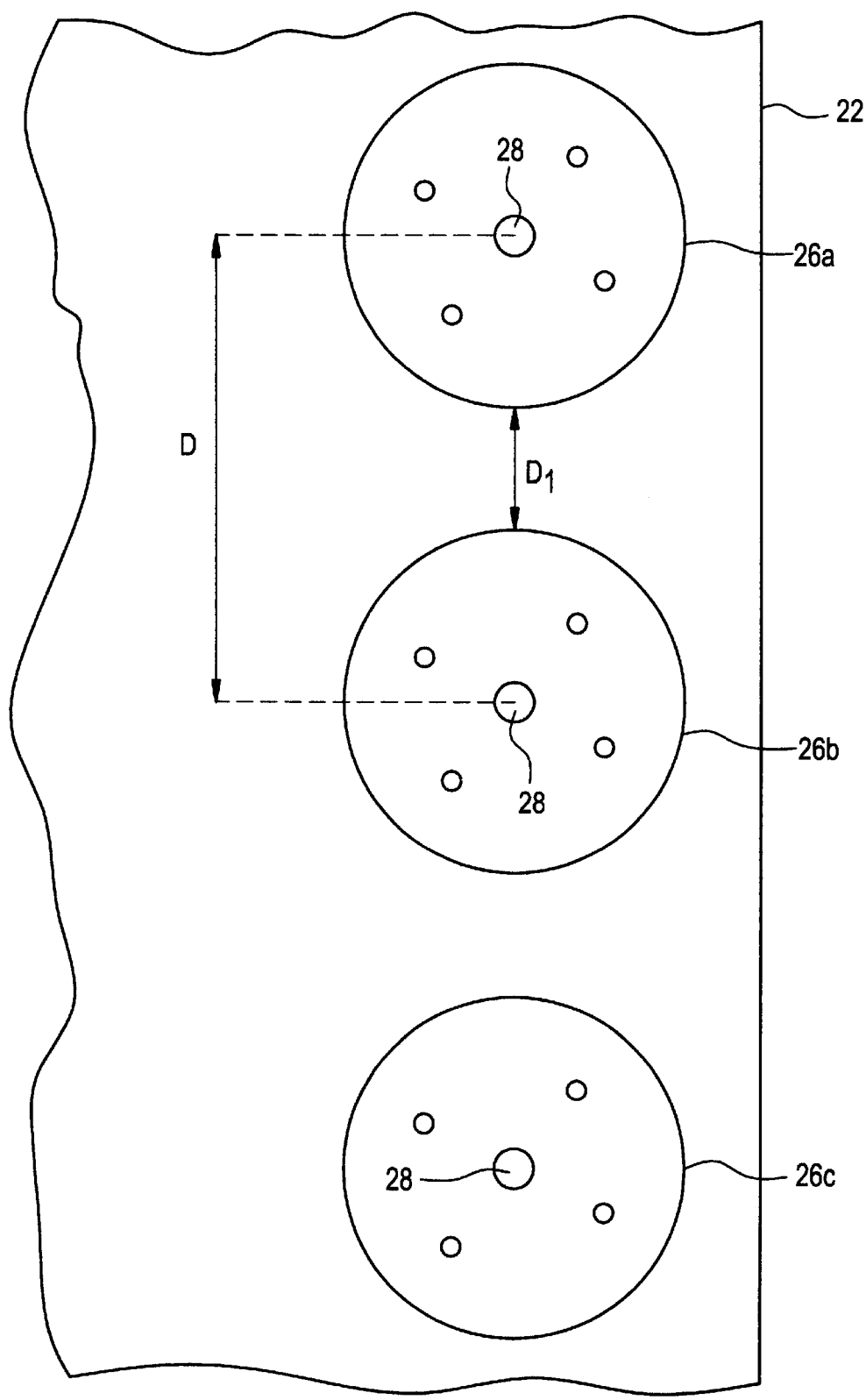
FIG. 4 shows a line of fastening means adjacent to the edge of a thermoplastic sheet.

FIG. 4 shows first thermoplastic sheet 22 on top of which close to and parallel with the edge thereof, are placed fastening means 26a, 26b and 26c. The fastening means are secured to the deck of the roof along with the first thermoplastic sheet, with nails, screws or bolts through openings or holes 28. Typically, the size of the fastening means 26a, 26b and 26c is about 0.5 to 2 inches and the distance D between the center of one fastening means to the center of the adjacent fastening means is about 4 to 12 inches. The distance D, between the circumference of adjacent fastening means is about 0.5 to 1 inch.

Figure 5:
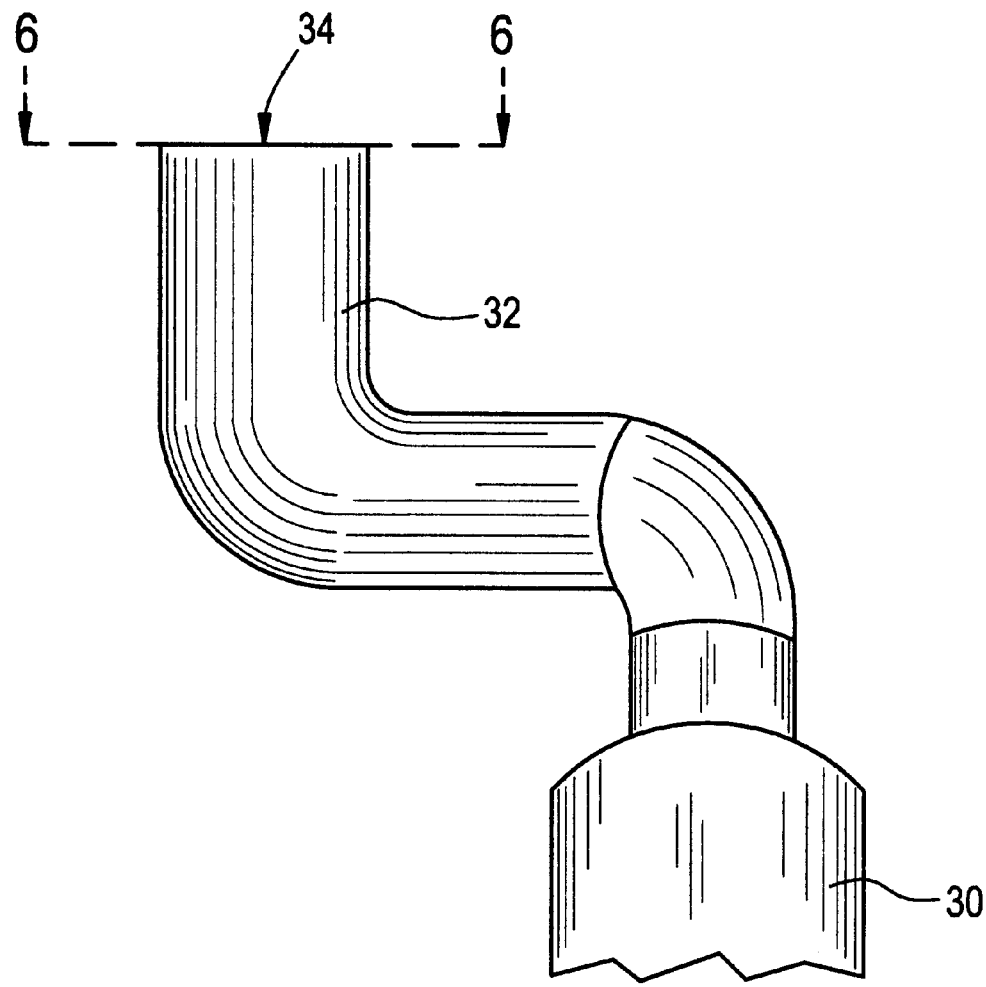
FIG. 5 shows a heating element including a nozzle used in conjunction with the pressure roller of the present invention.
Figure 6:
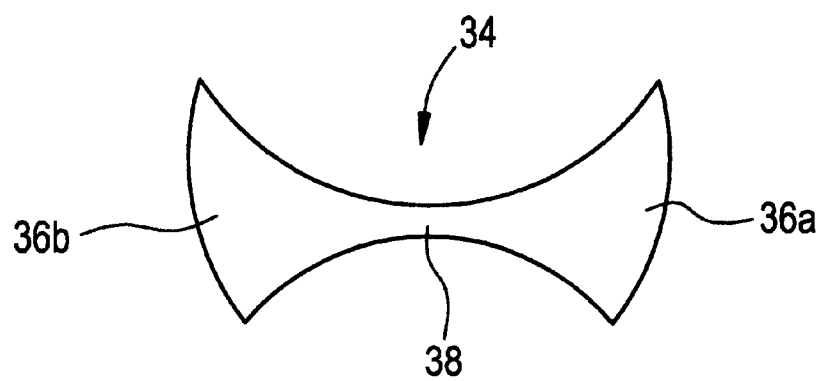
FIG. 6 shows the configuration of the outlet of the nozzle taken along the line 5—5 of FIG. 5.

FIG. 5 shows a heating element 30 having a nozzle 32 and outlet of nozzle 34. The heating element is used in conjunction with pressure roller 10 for the welding of the thermoplastic sheets. The heating element also contains a blower (not shown) which forces heated air through the opening 34 of nozzle 32 onto the overlapping portion of the thermoplastic sheets. The configuration of opening 34 of nozzle 32 is shown in FIG. 6. The opening is designed to direct most of the hot air onto both sides of the fastening means when the overlapping portions of the thermoplastic sheets will be welded together as a result of heating and compressing them by the pressure roller. Accordingly, opening 34 comprises large openings 36a and 36b and a restricted opening portion 38 between 36a and 36b. It was found that the restricted opening portion 38 still allows sufficient outflow of heated air to sufficiently soften the overlapping portion of the thermoplastic sheets over and under the fastening means in order to weld the thermoplastic sheets together over the interposed fastening means.

Figure 7:
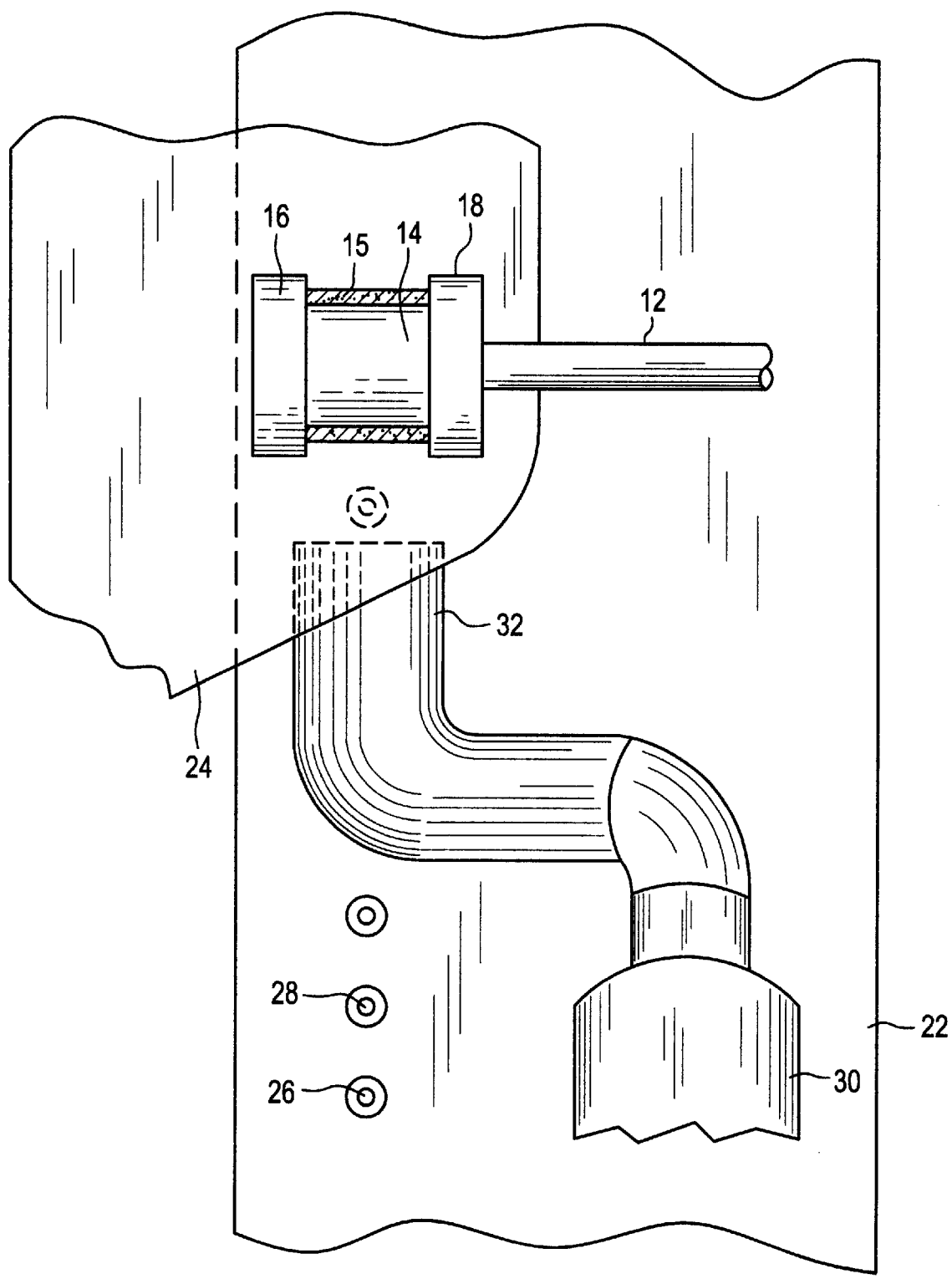
FIG. 7 shows the assembled pressure roller and the heating element constituting a portion of a welding apparatus as the apparatus proceeds to join two thermoplastic sheets on both sides of a fastening means.

FIG. 7 shows the assembled pressure roller 10 and heating element 30 having opening 34 of nozzle 32 pointed between first thermoplastic sheet 22 and second thermoplastic sheet 24. Nozzle 32 is positioned close to pressure roller 10 both of which are mounted on the chassis of an apparatus (not shown) which is propelled along the overlapping portions of the thermoplastic sheets. As the apparatus travels over the fastening means and on both sides thereof, the heated air generated by the heating element softens the upper face of the first thermoplastic sheet and the lower face of the second thermoplastic sheet to plasticity. Pressure roller 10 having distal end 16 and proximal end 18 travels on both sides of fastening means 26 exerting sufficient pressure onto the overlapped portion of the overlapping thermoplastic sheets to produce a weld therebetween. Moving conjointly with distal end 16 and proximal end 18 of pressure roller 14 having rubber cushion 15 thereon travels over fastening means 26. Portions of the rubber cushion directly over the fastening means are compressed, while portions of the rubber cushion adjacent to the fastening means conform to the underlying second thermoplastic sheet and in sufficiently tight contact therewith to expel air from between the overlapping portions of the thermoplastic sheets so as not to allow formation of air pockets or bubbles.

FIG. 8 shows two thermoplastic sheets welded together in which the numeral 22 denotes the first thermoplastic sheet, the numeral 26 denotes a single fastening means which has hole 28 to receive a bolting means to secure first thermoplastic sheet 22 onto the underlying roof deck. Seam 40 is the edge of second thermoplastic sheet 24 while invisible seam 42 is the edge of the first thermoplastic sheet 22.

Comparative tests were conducted with a prior art apparatus disclosed in U.S. Pat. No. 4,834,828 and the present invention. The prior art apparatus comprised of a weld wheel the center of which had a groove designed to ride over a fastening means. The weld wheel was made of metal and the groove had no cushioning thereon. The weld wheel, the groove of which was positioned over fastening means, was not able to ride over the fastening plates without losing contact with the underlying thermoplastic sheet at any speed and temperature.

Using the same apparatus as described in the '828 patent, but replacing the weld wheel with the pressure roller of the present invention, showed that the soft, cushioned center of the pressure roll was able to ride over the fastener means without loosing contact with the underlying thermoplastic sheet on either side of the fastening means and without the formation of air pockets or bubbles between the welds. Welds at 1050° F., 1100° F., 1150° F., 1200° F. and 1250° F. were found to be excellent at a speed of 8 to 10 feet per minute.

In a preferred embodiment we use a 5.5" pressure roller having a 2" soft rubber foam center and a heating element with a 5.25" nozzle opening. This embodiment is able to produce a 5" weld.

The present invention comprising of the pressure roller and heating element combination can be mounted into a suitable welding apparatus in an appropriate manner. Such apparatus is disclosed U.S. Pat. No. 4,834,828 which is incorporated herein by reference. Said apparatus comprises a chassis, means for rollably supporting the chassis, a motor mounted on the chassis to propel the same on the rollable support, a handle portion including means for detecting the temperature when the apparatus is used for welding the overlapping portions of two thermoplastic sheets on both side of a fastening means positioned between the overlapping portions of the thermoplastic sheets.

| PARTS LIST USED IN THE DRAWINGS | |
|---|---|
| Pressure roller | 10 |
| Axle | 12 |
| Center of roller | 14 |
| Rubber cushion on center of roller | 15 |
| Distal end of roller on axle | 16 |
| Proximal end of roller on axle | 18 |
| Deck | 20 |
| First thermoplastic sheet | 22 |
| Second or overlapping thermoplastic sheet | 24 |
| Fastening means/stress plate | 26, 26a, 26b, 26c |
| Holes for bolting means (screws and nails) | 28 |
| Distance between holes of bolting means | D |
| Distance between holes of fastening means | $D_1$ |
| Heating element | 30 |
| Nozzle | 32 |
| Outlet of nozzle | 34 |
| Large openings in nozzle | 36a, 36b |
| Small, restrictive opening in nozzle | 38 |
| Visible seam | 40 |
| Invisible seam | 42 |

The invention has been described in detail with particular reference to certain preferred embodiments thereof, but it will be understood that variations and modifications can be effected within the spirit and scope of the invention.

What is claimed is:

1. A pressure roller in combination with a heating element for a welding apparatus for running longitudinally along an area of overlapment between an underlying first thermoplastic sheet having an upper surface and being supported by a deck of a roof structure, said first thermoplastic sheet being secured to said deck by a line of fastening means adjacent to and parallel with an edge thereof, and an overlapping second thermoplastic sheet having a lower surface which is disposed over said line of fastening means and in an overlapping registry with a portion of said first thermoplastic sheet, said pressure roller being made of stainless steel and being integral with a stainless steel axle designed to be connected to a driving means at one end thereof and comprising at the other end of said axle: a distal end, a proximal end and a center portion which defines a groove between the distal and proximal ends, said groove carrying an elastomeric cushion designed to ride over said line of fastening means said elastomeric cushion selected from the group consisting of natural rubber, acrylate-butadiene rubber, cis-polybutadiene, chlorobutyl rubber, chlorinated polyethylene elastomers, polyalkylene oxide polymers, ethylene vinyl acetate, hexafluoropropylene-vinylidene fluoride-tetrafluoroethylene terpolymers, butyl rubbers, polyisobutene, synthetic polyisoprene rubber, styrene-butadiene rubbers, tetrafluoroethylene propylene copolymers, and thermoplastic-copolyesters, said elastomeric cushion having a durometer from 41 to 80 Shore A;

said heating element positioned between the upper surface of said first thermoplastic sheet and the lower surface of said second thermoplastic sheet and above said line of fastening means having a blower therein and a nozzle having an outlet therein with three portions, two of which are large openings to allow delivery of the major portion of heated air produced by the heating element, and a restricted portion therebetween which allows delivery of sufficient amount of the heated air to soften the overlapping portions of said thermoplastic sheets under and over said fastening means, wherein said nozzle having said outlet with three portions therein being permanently set without allowing variations in the selective distribution of heated air over the overlapping portions of said thermoplastic sheets;

wherein as said welding apparatus is advanced longitudinally along the overlapping portions of said thermoplastic sheets while being heated by said heating element softens to plasticity the upper surface of said first thermoplastic sheet and the lower surface of said second thermoplastic sheet and said pressure roller produces a weld on both sides of said line of fastening means.

2. The pressure roller in combination with a heating element according to claim 1 wherein said fastening means comprises a plurality of stress plates or a batten bar.

3. The pressure roller in combination with a heating element according to claim 1 wherein said fastening means secure said first thermoplastic sheet to said deck of a roof structure with nails, screws or bolts through openings in said fastening means.

4. The pressure roller in combination with a heating element according to claim 1 wherein said fastening means have a circular configuration and a diameter of from about 0.5 to 2 inches.

5. The pressure roller in combination with a heating element according to claim 1 wherein the distance between the center of one fastening means to the center of the adjacent fastening means is about 4 to 12 inches.

6. The pressure roller in combination with a heating element according to claim 4 wherein said circular fastening means are spaced from each other at a distance of from 0.1 to 1 inch.

7. The pressure roller in combination with a heating element according to claim 1 capable of producing a 5-inch weld.

\* \* \* \* \*